United States Patent [19]

Smith et al.

[11] 4,289,960
[45] Sep. 15, 1981

[54] ARTILLERY TRAINING ROUNDS TARGET SCORING SYSTEM

[75] Inventors: Chester L. Smith, Lake Hopatcong; William Donnally, Boonton Twp., Morris County, both of N.J.

[73] Assignee: The United States of America as represented by the Secretary of the Army, Washington, D.C.

[21] Appl. No.: 54,755

[22] Filed: Jul. 3, 1979

[51] Int. Cl.³ .............................................. G01P 3/68
[52] U.S. Cl. ................................. 250/222 R; 324/178
[58] Field of Search .......................... 250/221, 222 R; 324/178

[56] References Cited

U.S. PATENT DOCUMENTS 3,727,069  4/1973  Crittenden, Jr. et al. ...... 250/222 R

*Primary Examiner*—David C. Nelms
*Assistant Examiner*—Darwin R. Hostetter
*Attorney, Agent, or Firm*—Nathan Edelberg; Robert P. Gibson; Max Yarmovsky

[57] ABSTRACT

Methods and apparatus for detecting the impact of munitions in a predefined target region during weapons training. The apparatus includes a plurality of photodetectors (12), each of which has a predetermined field of view in the horizontal plane, the target range being defined by the logical union of these fields of view. The impact of a munition within or without the target area causes a signal to be transmitted (14) to a receiving location which is proximate the gun site. At the receiving location (21), the incoming signals from the plurality of sensors are subjected to logical operations (24) which indicate to the operator of the gun whether or not the projectile impacted within or without the target area, or to the left or to the right of the target area. In addition, a running total (79) is kept of the number of successful impacts.

14 Claims, 7 Drawing Figures

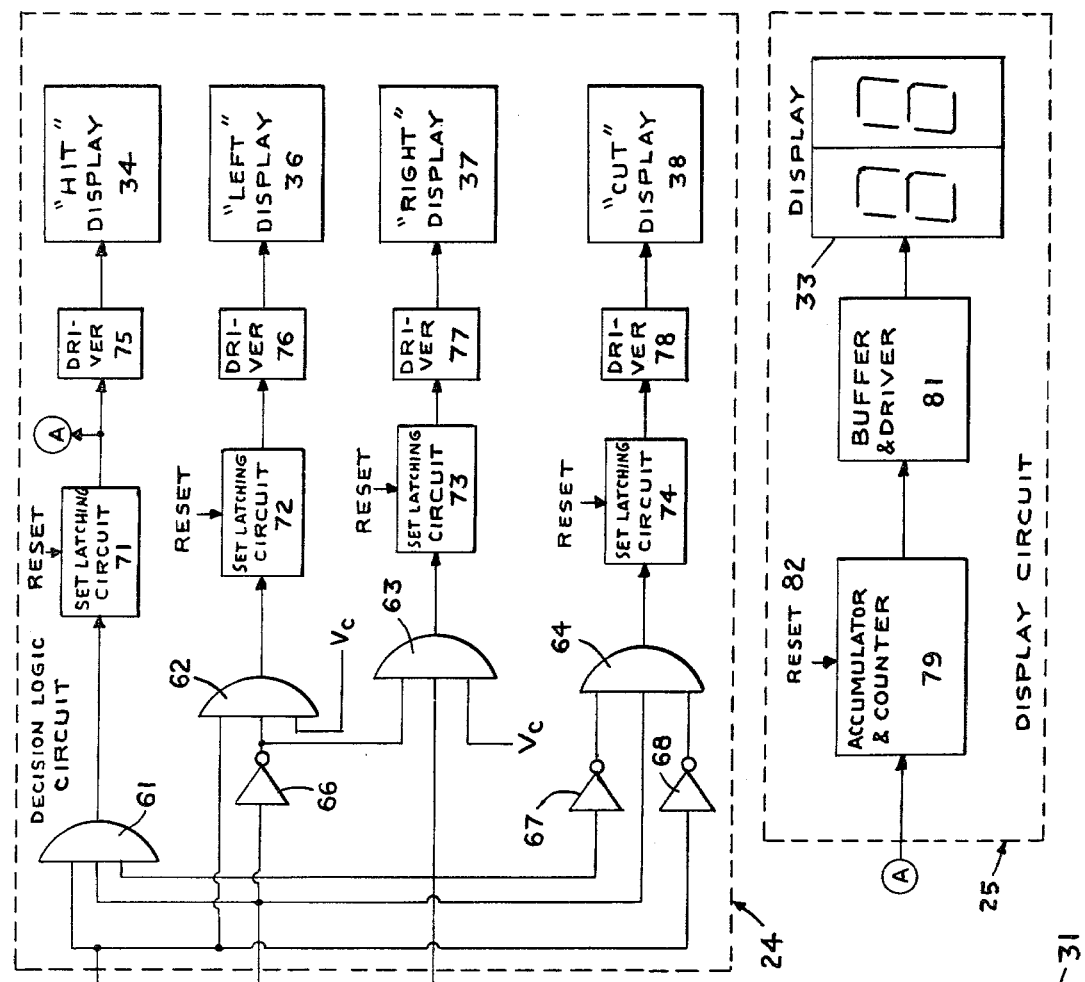
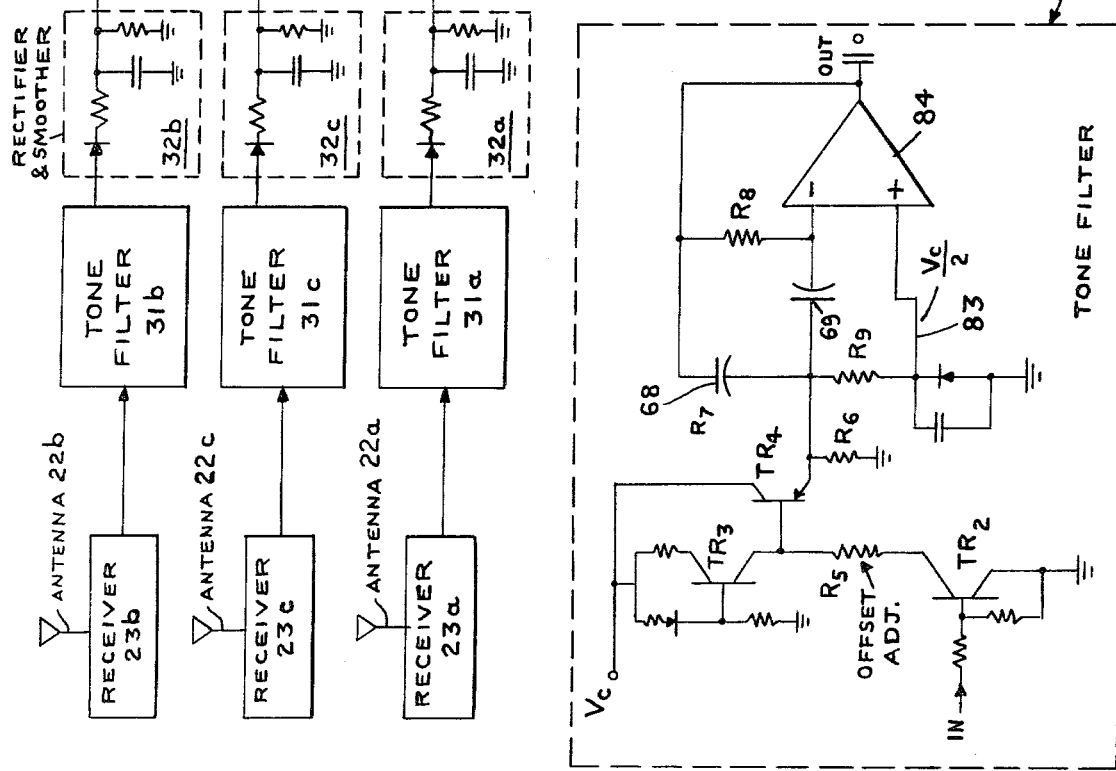
FIG. 6
FIG. 7

ARTILLERY TRAINING ROUNDS TARGET SCORING SYSTEM

GOVERNMENTAL INTEREST

The invention described herein may be manufactured, used and licensed by or for the Government or Governmental purposes without the payment to us of any royalties thereon.

TECHNICAL FIELD

Broadly speaking, this invention relates to weapons training. More particularly, in a preferred embodiment, this invention relates to methods and apparatus for remotely detecting and scoring artillery training rounds, and the like.

BACKGROUND OF THE INVENTION

The traditional technique employed to train artillery and mortar crews involves stationing an observer in a protected position, well forward of the firing battery. This forward observer is advantageously located in a position from which he can view the entire target area and report back by radio or field telephone the success or failure of each round that is fired. To assist the observer, all larger caliber training rounds, including artillery and mortar rounds ranging from 40 millimeters to 8 inches, have a point-detonating fuse located in the nose of the projectile. This fuse comprises a standardized charge that produces a brilliant flash of light, a loud report, and a puff of smoke upon impact. Obviously, the purpose of this charge is to enable the forward observer to observe and report back to the firing battery the approximate impact point of the projectile.

Even though such training rounds carry no high explosives, they, nevertheless constitute a very real hazard and the forward observer cannot be located too close to the target. Thus as a practical matter, due to the remoteness of the observer some inaccuracies as in target scoring must be expected. This problem is compounded when the projectiles to be scored comprise ground-to-ground, air-to-air, air-to-ground, and ground-to-air missiles and rockets, due to the much greater risk involved.

Various attempts have been made to overcome this problem. For example, one proposed system involves tracking the projectile to the target by radar. It will be apparent, however, that such a system is expensive and very complex. Worse, it usually requires specially modified training rounds and firing tactics.

Another proposed system utilizes a target comprising a spatial, geometric pattern of laser diodes. Any projectile entering the target area is required to have a retroreflector fitted thereto so that, as the projectile enters the target area, it interrupts one or more of the laser beams and produces a signal on the corresponding light sensors. Again, specially modified training rounds must be employed.

Yet another proposed system employs a re-radiating microwave transmitter on each projectile. Once again, specially modified ammunition is required. High-speed motion picture photography and closed-circuit television have also been used to detect and score artillery training practice.

All of the above-described systems suffer from the disadvantage of an extremely high system cost and/or the fact that modification of the projectile and fuse, and in some cases changes in personnel training tactics, are required. Since personnel training occupies a considerable time, and large quantities of ammunition, all of the prior art approaches discussed above are either restrictive or undesirable. As a result, it has become clear that a new technique for target scoring that avoids the shortcomings of the prior art is very much in demand.

SUMMARY OF THE INVENTION

As a solution to those and other problems, the instant invention comprises a plurality of optical radiation detectors, each having a fixed field of view in the horizontal plane, the logical union of the fields of view defining a target region in the horizontal plane; a corresponding plurality of means for transmitting to a remote location the output signal which is generated by a corresponding optical radiation detector in response to the impact of a munition in the field of view of the detector; means for receiving the output signals transmitted by said plurality of transmitting means; and means, connected to said receiving means, for generating a first output signal if the munition impacts within the target region and a second output signal if the munition impacts without the target region.

The invention, and its mode of operation, will be more fully understood from the following detailed description, when taken with the appended drawings in which:

BRIEF DESCRIPTION OF THE DRAWINGS

FIG. 6 is a block schematic diagram of an illustrative receiving location in the apparatus shown in FIG. 1; and FIG. 7 is a schematic diagram of an illustrative tone filter for use in the apparatus shown in FIG. 6.

DETAILED DESCRIPTION OF THE INVENTION

Figure 1:
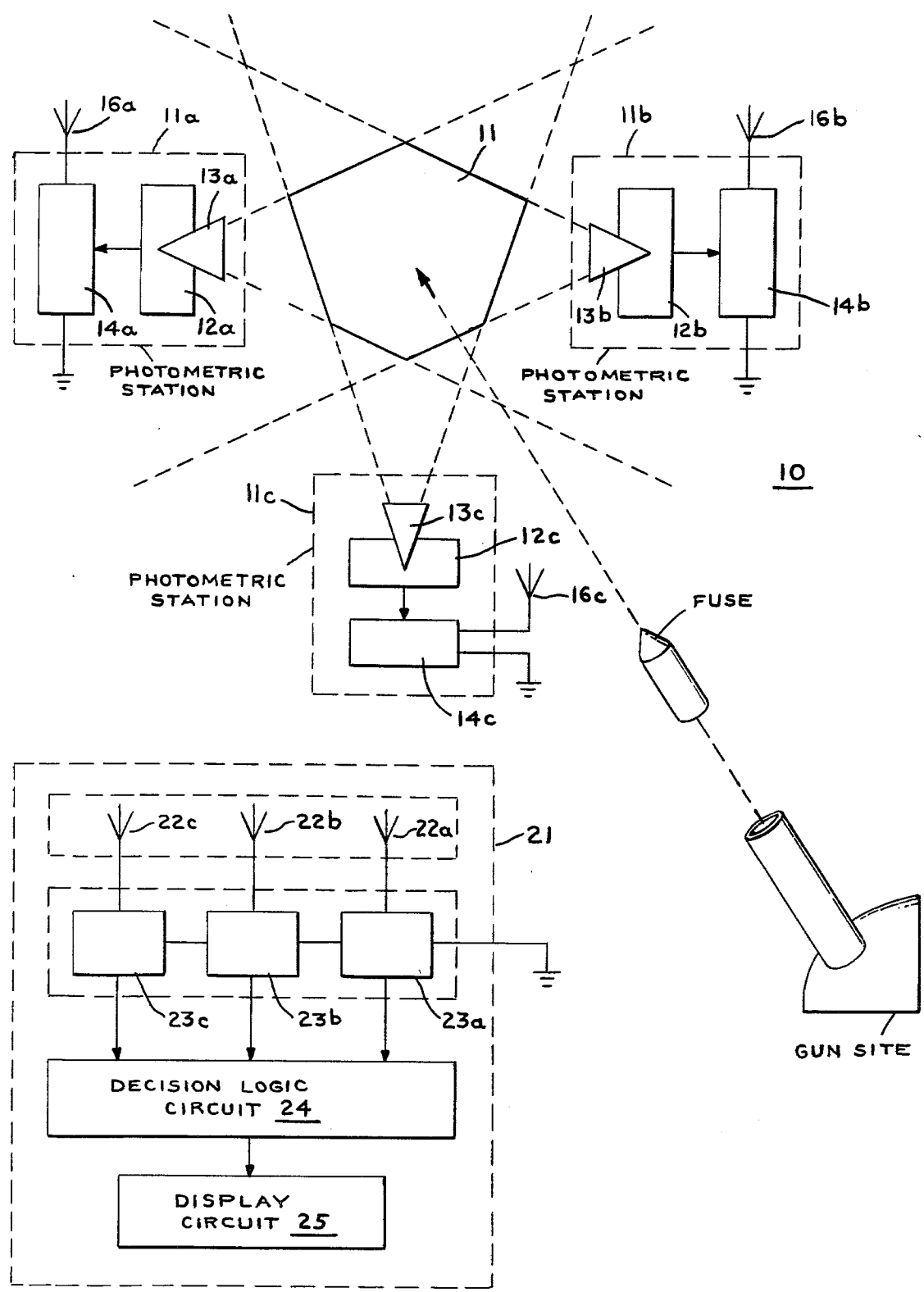
FIG. 1 is a block schematic diagram of a first, illustrative embodiment of the invention.

FIG. 1 depicts an illustrative artillery target scoring system according to the invention. As shown, system 10 comprises three, substantially identical, photometric reporting stations 11 disposed about the target area under surveillance. One skilled in the art will appreciate that more or less than three photometric stations may be used, as dictated by the size and topography of the target area.

Each photometric station includes a photo-detector 12, a cone 13 for modifying the input angle of the light beam impinging upon the photocell, and a radio-frequency transmitter 14 connected to the output of the photocell and having a suitable transmitting antenna 16 connected thereto.

The target area 17 is defined by the logical union of the fields of view of the angle-modifying cones associated with the photometric stations. One skilled in the art will appreciate that the cones 13 limit the field of view of each photocell to a fixed angle in the ground plane. Advantageously, each cone angle may be varied to adjust the field of view to the particular target area of interest.

At the gun site, a receiving station 21 includes a plurality of antennas 22 and receivers 23, one for each of the transmitters 12 at the target area. As will be explained, the outputs of the receivers 23 are connected to a decision logic circuit 24, thence, to some suitable display device 26, for example, an array of light emitting diodes, or the like. Each transmitter-receiver pair operates on a different frequency using, for example, narrow-band FM modulation to insure that radio-frequency interference (RFI) does not improperly interfere with, or give false signals to, the receiving station 21. For use with the target scoring system according to the invention, each round of ammunition advantageously includes a point-detonating fuse containing a spotting charge. This charge produces a light flash, smoke, and an explosion upon ground impact. The flash should generate a light output of about 150,000 candle power, which is more than adequate for detection by the photo-detectors 12.

In operation, any light flash occurring within the field of view of any one or more of the photometric stations 11 will generate an electrical pulse at the output of the corresponding photo-detector. This pulse is then amplified by circuitry within transmitter 14 and, if the amplitude and time duration matches the preset requirements of the electronics within the transmitter, the transmitter is turned on and generates a tone which modulates the radio-frequency signal sent to the antenna. The resultant, modulated carrier is transmitted to the receiving station 21 at the gun site so that the personnel operating the battery can review the results of the firing. As previously discussed, the output signals from the three receivers 23 are connected to a decision logic circuit 24 which drives a display circuit 25 to tell the gun crew the results of each firing. For example, if three radio-frequency signals are received simultaneously, then obviously, the projectile fell within the defined target area 17. On the other hand, the total lack of any radio-frequency signal records as "out", meaning that the projectile must have impacted completely outside of the target area.

Figure 2:
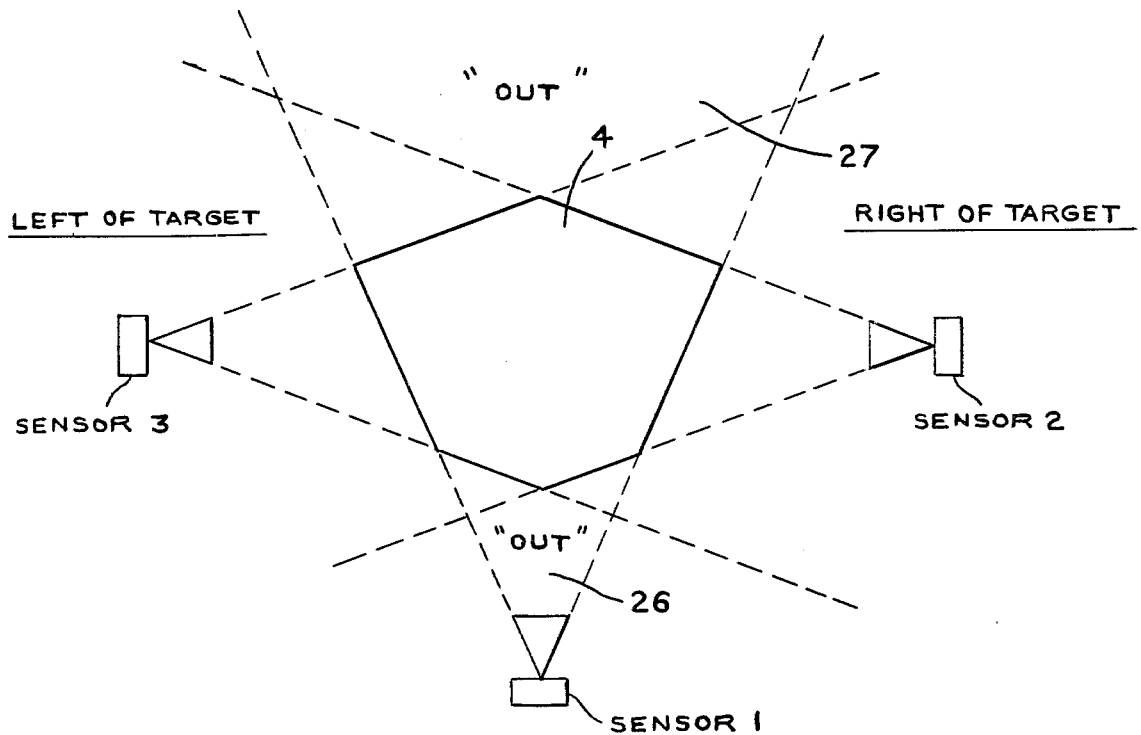
FIG. 2 is a schematic diagram illustrating the manner in which the apparatus shown in FIG. 1 defines a target region.

FIG. 2 shows the decision matrix for a typical target scoring system according to the invention, using three sensors. The remote ground station 21 displays the location of the projectile impact which is determined by the particular combination of sensors which respond to the pyrotechnic flash caused by the fuse in the projectile. For example, if all three sensors respond to the flash, the ground station displays a "hit", meaning that the projectile impacted directly within the target area 17. If only sensor 1 responds, the ground station display will indicate to the gun crew that the shell impacted "out", i.e., outside the target area, i.e., in either areas 26 or 27. In a similar manner, a "right" or "left" decision can be displayed, as shown in Table A below.

TABLE A

| (12c) Sensor 1 | (12b) Sensor 2 | (12a) Sensor 3 | Decision Displayed | Remarks |
|---|---|---|---|---|
| yes | yes | yes | "HIT" | "yes" = flash seen by sensor |

TABLE A-continued

| (12c) Sensor 1 | (12b) Sensor 2 | (12a) Sensor 3 | Decision Displayed | Remarks |
|---|---|---|---|---|
| yes | no | no | "OUT" | |
| no | yes | no | "LEFT" | "no" = no flash seen by sensor |
| no | no | yes | "RIGHT" | |
| no | no | no | -no indication- | |

DECISION MATRIX

If no indication at all is displayed by display device 25, one or other of the following conditions must be true: (1) the projective impacted outside the field of view of any of the sensors; (2) there was no projectile impact (i.e., the gun was not fired); (3) the projectile impacted beyond the range of any of the sensors; or (4), the projectile impacted but the fuse failed to detonate.

Figure 3:
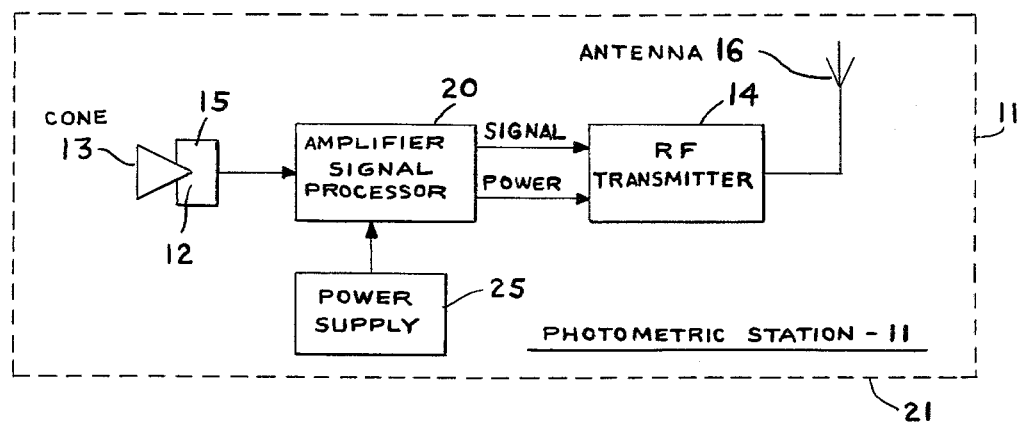
FIG. 3 is a block schematic diagram of an illustrative photometric station for use in the apparatus shown in FIG. 1.

FIG. 3 depicts the photometric station 11 in somewhat greater detail. As shown, station 11 comprises a photo-detector 12, for example, a silicon barrier-layer photocell, and an adjustable photometer cone 13, all mounted in some suitable housing 15. The output of the photocell is connected to an amplifier/signal processor 20 which, in turn, is connected to some suitable power suppyly 25 and, by a signal lead and a power lead, to RF transmitter 14, thence to antenna 16. As will be more fully explained, the amplifier/signal processor includes a photocell preamplifier, a tone generator, a pulse stretcher, and a switching circuit which connects power to the RF transmitter when it is desired to transmit information to ground station 21. Advantageously, antenna 16 has a directional radiation pattern for improved reception at ground station 21 near the gun site. Since photometric station 11 is intended to operate unattended in the field for long periods of time, the power supply 25 will typically comprise a battery having a long shelf-life, in excess of one year. Of course, the battery must have sufficient power to operate the transmitter for approximately one second each time that the photocell circuitry responds to the pyrotechnic flash of an impacting projectile. Alkaline-type cells are suitable for these requirements; however, other types of batteries may be used, depending upon a particular application required.

Figure 4:
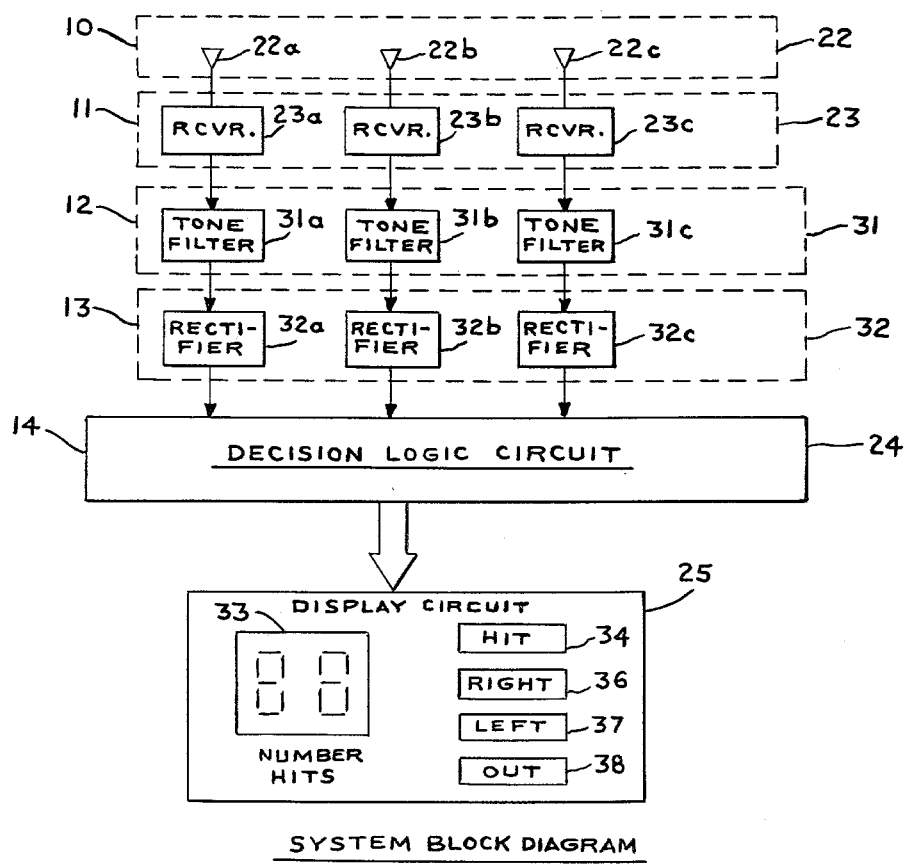
FIG. 4 is a block schematic diagram of an illustrative ground station for use with the apparatus shown in FIG. 1.

FIG. 4 depicts the target-scoring ground station 21 in greater detail. As previously discussed, ground station 21 receives and demodulates the narrow-band FM tone-modulated signals transmitted from each photometric sensor that responds to the pyrotechnic flash of an impacting projectile. Each of the receivers 23 is tuned to the frequency of a corresponding transmitter for a photometric sensor. The outputs of the receivers 23 are connected to a plurality of narrow band-pass tone filters 31 to ensure that radio-frequency interference (RFI) does not cause the decision logic circuit 24 to make a false decision on the impact location of a projectile. A plurality of rectifiers 32 are interposed between the outputs of the tone filters and decision logic circuit 24. These rectifier circuits perform the following functions: (1) they convert the sinusoidal waveform at the output of the tone filters to a DC logic level, the proper operation of the decision circuit; and (2) they assure that the duration of the incoming tone is sufficiently long to reliably trigger the decision logic circuit, i.e., they help the circuit discriminate against spurious noise signals of short duration.

Decision logic circuit 24 automatically translates the information received from the remote photometric stations in accordance with the decision matrix set forth in Table A, above. A digital accumulator may be associated with logic circuit 24, if desired, to accumulate the total number of hits in a given day's firing. Display circuit 25 includes a plurality of alphanumeric LED readout devices 33 and a plurality of indicator lights 34, 36, 37 and 38 which respectively indicate if a given impact is a direct hit within the target area, a hit which is completely outside the target area, or a hit which is respectively to the right or left of the target area.

Figure 5:
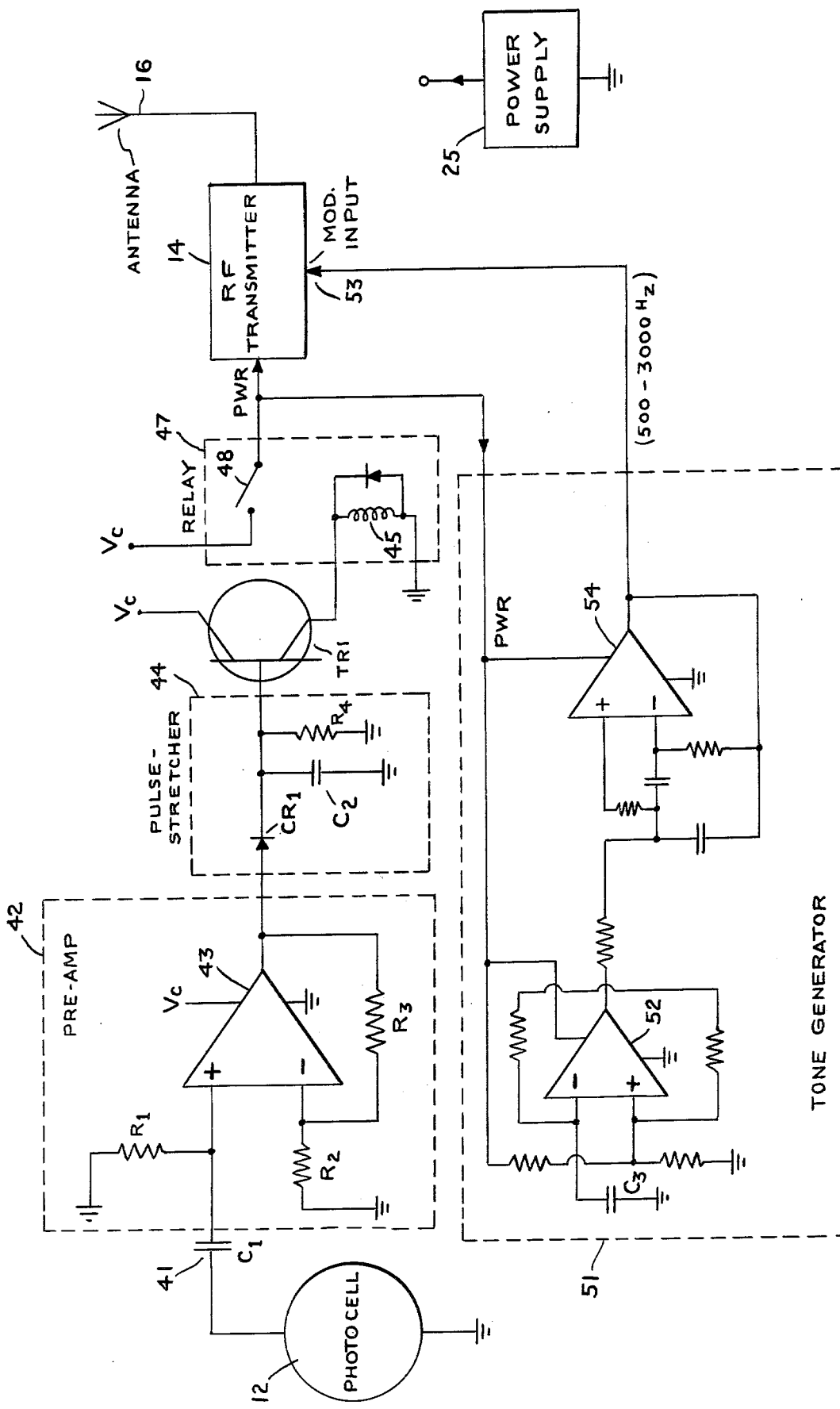
FIG. 5 is a block schematic diagram depicting the photometric transmitting station shown in FIG. 3 in greater detail.

FIG. 5 depicts the circuitry of photometric transmission station 11 in greater detail, with particular emphasis on the circuitry of the amplifier/signal processor 20. As shown, the output of photocell 12, for example, an IRC silicon barrier-layer photocell Model No. 52900GE9.5M is connected, via a capacitor $C_1$ to the input of a pre-amplifier 42. Pre-amplifier 42 comprises a high-gain, operational amplifier 43 with a feedback loop comprising a resistor $R_3$. The gain of the pre-amplifier is, of course, determined by the ratio of the resistors $R_2$ and $R_3$ where $R_2$ is a resistor connected to the inverting input of amplifier 43. The particular value chosen for resistor $R_2$ is determined by the characteristics of the particular photocell employed, and by the anticipated level of the light to be detected by the photocell. An example of the pre-amplifier gain required for a typical application, wherein a pyrotechnic flash of 150,000 candle power occurring at a maximum distance of 1,000 feet from the photocell, is determined as follows:

Assume:
(1) Uncorrected cell sensitivity, 5,=100 microamp/FT.-candle (equivalent sensitivity)
(2) Preamplifier load resistance, $R_L$=1000 ohm
Then:

$$\text{Foot candles at cell} = \frac{150,000 \; CP}{(1000 \; Ft)^2} = 0.15 \; \text{Ft-candle}$$

and current, I, through load resistance, $R_L$, is:
I=(0.15 Ft-candle)×(100 microamp/Ft-candle)
I=15 microamp
Consequently, the pulse amplitude (Vin) at the non-inverting input 5 of operational amplifier 7 is Vin=(1000 ohm)×(15×10$^{-6}$ amp)=15 millivolts. Therefore, to generate the maximum possible excursion of amplifier output 8, the required gain is set equal to the battery 20 voltage divided by the pulse voltage developed across the load resistor 2. If the battery voltage is 12 VDC, then the required gain, $$G = \frac{12 \; \text{volts}}{1.5 \times 10^{-2} \text{volt}} \geq 800.$$

Advantageously, operational amplifier 43 comprises a programmable operational amplifier model XR4202, manufactured by Exar Integrated Systems, Inc. This amplifier has the advantage of extremely low power supply drain, typically 20 microamperes, which is a desirable feature because preamplifier 42 is "on" at all times, hence, always draws current from power supply 25.

The output of preamplifier 42 is fed to a pulse-stretching circuit 44, which effectively lengthens the duration of the output pulse from preamplifier 42 from several milliseconds to approximately one second. The exact duration of the lengthened pulse is determined by a resistor R4 and a capacitor C2 in the stretching circuit 44. Pulse stretcher 44 includes a rectifier diode $CR_1$ connected to the output of operational amplifier 43. Rectifier $CR_1$ blocks the discharge of capacitor C2 through the output terminal of operational amplifier 43. The stretched pulse from pulse-stretcher 44 is fed to the armature winding 46 of a relay 47, via the collector-emitter path of a buffer transister TRI. Relay 47 includes a pair of contacts 48 which connect power from power supply 25 to RF transmitter 14, as previously discussed. Relay contacts 48 also connect power to a tone generator 51, thus, whenever a pyrotechnic flash occurs within the field of view of photocell 12, a tone-modulated RF signal is transmitted, via antenna 16, to the target-scoring ground station 21 located near the gun site. Depending on the specific system requirements, a flash will trigger the transmission of a tone for a sufficiently long time for the receiving ground station to discriminate against RFI and other noise sources. Typically, pulse stretching circuit 44 causes the tone transmission to last about one second.

Tone generator 51 comprises a feedback operational amplifier 52 connected to generate an approximation to a squarewave. The fundamental frequency of the squarewave generator is selected to lie within the baseband of RF transmitter 14, typically 500 to 3,000 hertz. The filter stage, including capacitor C3, which is associated with amplifier 52 removes the third and higher harmonics of the squarewave. The resulting approximation to a sinewave is fed to the modulation input 53 of transmitter 14, via a second operational amplifier 54, connected as a voltage amplifier.

FIG. 6 depicts the circuitry of ground station 21 in greater detail. As previously discussed, ground station 21 receives and processes the tone-modulated RF signals transmitted from the remote photometric stations 11. The previously mentioned tone filters, rectifiers and decision logic circuit process the information received from the remote photometric stations to display the impact location of the projectile. In addition, an accumulator in the display circuit keeps a running count of the number of hits that occur during a given day's firing. As shown in FIG. 6, each antenna 22 and receiver 23 detect the RF transmission from one and only one of the photometric stations 11. The demodulated output of each receiver 23 is fed to a narrow-band tone filter 31 which removes unwanted noise, thereby increasing the reliability of detecting the transmission from the corresponding photometric station 11. The output of the tone filter is then peak-rectified by one of the rectifiers 32 which have the additional function of ensuring that the tone received from the remote sensing station 11 has a certain minimum duration, in order to trigger operation of the decision logic circuit 24. As shown, decision logic circuit 24 comprises a plurality of interconnected AND-gates 61–64 having inputs directly interconnected, or connected through a plurality of inverters 66–68, to implement the decision logic table set forth in Table A, above. For example, the output of rectifier 32b is directly connected to one input of AND-gates 61 and 62 and, via an inverter 68, to one input of AND-gate 64. In similar fashion, the output of rectifier 32c is directly connected to one input of AND-gate 61 and, via inverter 66, to one input of AND-gates 62 and 63. The output of rectifier 32a is directly connected to one input of AND-gate 63 and AND-gate 61 and, via an inverter 67, to another input of AND-gate 64. AND-gates 61–64 may comprise any suitable logic circuit, however, CMOS AND-gates type CD 4073B were employed in an experimental prototype actually built and tested. The outputs of AND-gates 61–64 are respectively connected to the set inputs of a plurality of latching circuits 71–74, the outputs of which are respectively connected, via a plurality of driver circuits 75–78, to the display circuits 34, 36, 37 and 38. Again, inverters 66–68 and latching circuits 71–74 may be any suitable device but CMOS inverters CD4049A and quad-latch circuits CD4043B were employed in the experimental prototype built and tested.

The display circuit 25 comprises an accumulator/counter 79 connected to the output of latching circuit 71 to accumulate the number of hits that are detected by the system. The output of counter 79 is connected to a buffer-driver 81, thence, to the alphanumeric display 33. Display 33 may comprise any suitable device, however, a low-voltage incandescent display unit Model No. 75-1-1-B-9-1 manufactured by the Penn-Keystone Corporation was employed in the prototype. Counter 79 may comprise any suitable device but a CMOS CD4033AE counter was employed in the prototype circuit. Buffer-driver 81 comprised a CMOS CA3082 device and alphanumeric display device 33 comprised two HB5082-7740 LED devices manufactured by the Hewlett Packard Corporation. When it is desired to reset the accumulated hit count, a reset logic level is applied to the reset input 82 of counter 79.

As shown in FIG. 7, each of tone filters 31 comprises a resonant band-pass active filter operating from a single-polarity power supply. Filter 31 includes a first transistor $TR_2$ which buffers the input signal applied to the base electrode thereof from the corresponding receiver 23. A second transistor, $TR_3$, connected in the base-emitter path of transistor $TR_2$ supplies a fixed current through a resistor R5, which resistor is adjusted to effect a DC offset at point 83 which is equal to one-half of the power supply voltage, thereby permitting symmetrical signal operation. The potential developed across resistor R5 is applied to the base of a third transistor, $TR_4$, thence to the inverting input of an operational amplifier 84. Amplifier 84 may comprise any suitable operational amplifier but a programmable operational amplifier type XR4202, manufactured by Exar Integrated Systems, Inc. was employed in the prototype. The bandwidth of the tone filter, as well as its gain and center frequency, are determined, of course, by the values of resistors R6, R7, R8 and R9 and capacitors C5 and C6.

In the embodiment of the invention described with reference to FIG. 1, three photometric stations, each having a single photo-detector, are shown. However, one skilled in the art will appreciate that a simple modification made to each of the photometric stations can significantly improve the accuracy of the system in determining the impact of the projectile. This modification involves the use of two or more cones and photocells at each photometric station and circuitry for modulating the transmitter with a different frequency tone corresponding to the output of each photocell. For example, by doubling the number of cones and photocells the system accuracy is quadrupled because the target is divided into four separate areas rather than one. In general, the system accuracy improves as the square of the number of equal angle sectors of view, i.e., the number of cones. Another improvement is to use additional photometric transmitting stations to more closely approximate a circular error probable target (CEPT). Also, although we have discussed the use of the invention to register and score artillery training rounds, it will be appreciated that the invention will work equally well with rockets, mortars, rifle-grenades, large and small caliber projectiles, bombs, and other munitions, regardless of the method of delivery. In those applications where the munition involved produces a flash upon impact which has a relatively low light ouput, relative to the ambient light background, optical filters tailored to the specific light spectrum of the munition, and capacitively coupled, high-gain preamplifiers may be used. One skilled in the art will also appreciate that the principles of this invention apply, not only to munitions which produce light upon impact by pyrotechnic, explosive, or other means, but also to munitions which have been modified to have a light source either attached to, or incorporated in, the projectile. As previously mentioned, the cone angle may be varied to adjust the field of view for the target area specified. Consequently, different target areas may be defined during a target practice session, as desired, by the use of moveable or interchangeable baffles in the cone. In target areas having high ambient light levels, for example, bright sunshine, the photometer heads or cones are advantageously flat-shaped such that the field of view does not include the sky. Such flat-shaped fields of view are achieved with pie-shaped segment photometer heads. The flat-shaped pie-segment photometer heads may also have a moveable system of baffles and apertures associated therewith to allow total flexibility in defining the target area to be surveyed.

One skilled in the art may make various changes and substitutions to the layout of parts shown without departing from the spirit and scope of the invention. While the invention has been disclosed with regards to a system for detecting and scoring the impacts of munitions, it will be appreciated that the invention is not so limited and can be used for example to detect any physical phenomenon manifesting itself as or by bursts of radiation which need not necessarily be limited to optical radiation in the visible spectra but may include infrared, ultraviolet, x-ray, gamma ray, radioactive, etc., etc.

What is claimed is:

1. Apparatus for registering and scoring the impact of an incoming munition, said munition being of a type that generates a burst of radiation upon impact, which comprises:

a plurality of radiation detectors, each having a fixed field of view in the horizontal plane, the logical union of said fields of view defining a target region in the horizontal plane;

a corresponding plurality of means for transmitting to a remote location an output signal which is generated by a corresponding radiation detector in response to the impact of said munition in the field of view of said detector;

means for receiving the output signals transmitted by said plurality of transmitting means; and means, connected to said receiving means, for generating a first output signal if said munition impacts within said target region and a second output signal if said munition impacts without said target region.

2. The apparatus according to claim 1 wherein said radiation detectors and said plurality of transmitting means are remote from the source of said munition and said receiving means and said first and second output signal generating means are proximate the source of said munition.

3. The apparatus according to claim 2 wherein each of said radiation detectors comprises:
- a photo-detector sensitive to optical radiation in the frequency band generated by said munition on impact; and
- means, positioned in the optical path of said photo-detector, for limiting the effective field of view of said photo-detector.

4. The apparatus according to claim 3 wherein said field limiting means is adjustable so that each of said plurality of photo-detectors may be selected to have a different field of view.

5. The apparatus according to claim 3 wherein each of said transmitting means comprises:
- a preamplifier connected to the output of the corresponding photo-detector to amplify the output signal therefrom;
- a pulse stretching circuit, connected to the output of said preamplifier, for lengthening the pulse generated by said photo-detector upon the impact of a munition in the corresponding field of view;
- a source of a tone signal;
- a radio frequency transmitter having an RF output connected to an antenna and a modulation input connected to the output of said source of a tone signal and;
- means, responsive to an output pulse from said pulse stretching circuit, for enabling both said tone signal source and said RF transmitter whereby a signal indicative of a munition impact within said field of view is transmitted to said receiving means.

6. The apparatus according to claim 5 wherein said receiving means comprises;
- a plurality of radio frequency receivers, each connected to an antenna and tuned to the transmitting frequency of a corresponding one of said radio frequency transmitters;
- a corresponding plurality of filter circuits connected to the outputs of said radio frequency receivers for filtering-out spurious signals and radio frequency interference therefrom, said first and second output signal generating means comprising:
- a decision logic circuit comprising a plurality of logic gates having inputs selectively interconnected to the outputs of said plurality of filter circuits.

7. The apparatus according to claim 6 wherein said plurality of radiation detectors comprise three radiation detectors, the logical union of the fields of view of said three detectors defining said target region as well as first and second "out of target" regions, a "right of target" region, and a "left of target" region, said receiving means comprises three RF receivers and three tone filters, and said decision logic circuit comprises:
- a first AND-gate having three inputs respectively connected to the outputs of said three filters for generating said first output signal if all three of said detectors simultaneously indicate an impact in their respective fields of view; and
- a second AND-gate having three inputs, one input being connected directly to the output of a third one of said three filters, the other two inputs being respectively connected, via an inverter stage, to the first and second of said three tone filters and generating said second output signal if the output of the third one of said three detectors indicates a munition impact in its field of view and said first and second detectors simultaneously fail to indicate a munition impact in their respective fields of view.

8. The apparatus according to claim 7 wherein said decision logic circuit further comprises:
- a first latching circuit connected to the output of said first AND-gate;
- a first display circuit, connected to the output of said first latching circuit, for indicating that said munition has "hit" within said target region;
- a second latching circuit connected to the output of said second AND-gate; and,
- a second display circuit, connected to the output of said second latching circuit, for indicating when said munition has impacted "out" of said target region.

9. The apparatus according to claim 8 wherein said decision logic circuit further comprises:
- a third AND-gate having two inputs, one of said inputs being connected directly to the output of said second filter, a second input being connected, via an inverting stage, to the output of said third filter for generating a third output signal, when said second photo-detector generates an output signal indicative of a munition impact within its field of view and said third photo-detector simultaneously fails to indicate the impact of a munition within its field of view.

10. The apparatus according to claim 9 wherein said decision logic circuit further comprises:
- a third latching circuit connected to the output of said third AND-gate and a third display circuit connected to the output of said third latching circuit for indicating when said munition impacts "left" of said target region.

11. The apparatus according to claim 9 wherein said decision logic circuit further comprises:
- a fourth AND-gate having first and second inputs, the first input being connected directly to the output of said first filter and the second input being connected, via an inverter, to the output of said third filter for generating a fourth output signal when said first photo-detector generates a signal indicative of a munition impact within its field of view and said third photo-detector simultaneously fails to indicate the presence of a munitions impact within its field of view.

12. The apparatus according to claim 11 wherein said decision logic circuit further comprises:
- a fourth latching circuit connected to the output of said fourth AND-gate; and
- a fourth display circuit connected to the output of said fourth latching circuit for generating a signal indicating that said munition has impacted "right" of said target region.

13. A method of registering and scoring the impact of an incoming munition, said munition being of a type that generates a burst of optical radiation upon impact, said method comprising the steps of:
- defining a target area by directing a plurality of optical radiation detectors towards a common region in the horizontal plane, each of said radiation detectors having a fixed field of view in the horizontal plane, said target area being bounded by the logical union of said fields of view;
- detecting the impact of said incoming munition by means of the output signals generated by said plurality of optical radiation detectors; and then, determining, by logically operating on said output signals, if the impact of said munition is within or without said target area.

14. The method according to claim 13 including the further step of:
  determining by further logical operations on said output signals, if the impact of said munition is to the right or to the left of said target area.

* * * * *